Dec. 6, 1966 W. TURNER 3,290,154
EDIBLE BAKED CUP-SHAPED PRODUCT AND METHOD FOR MAKING SAME
Filed May 13, 1964 2 Sheets-Sheet 1
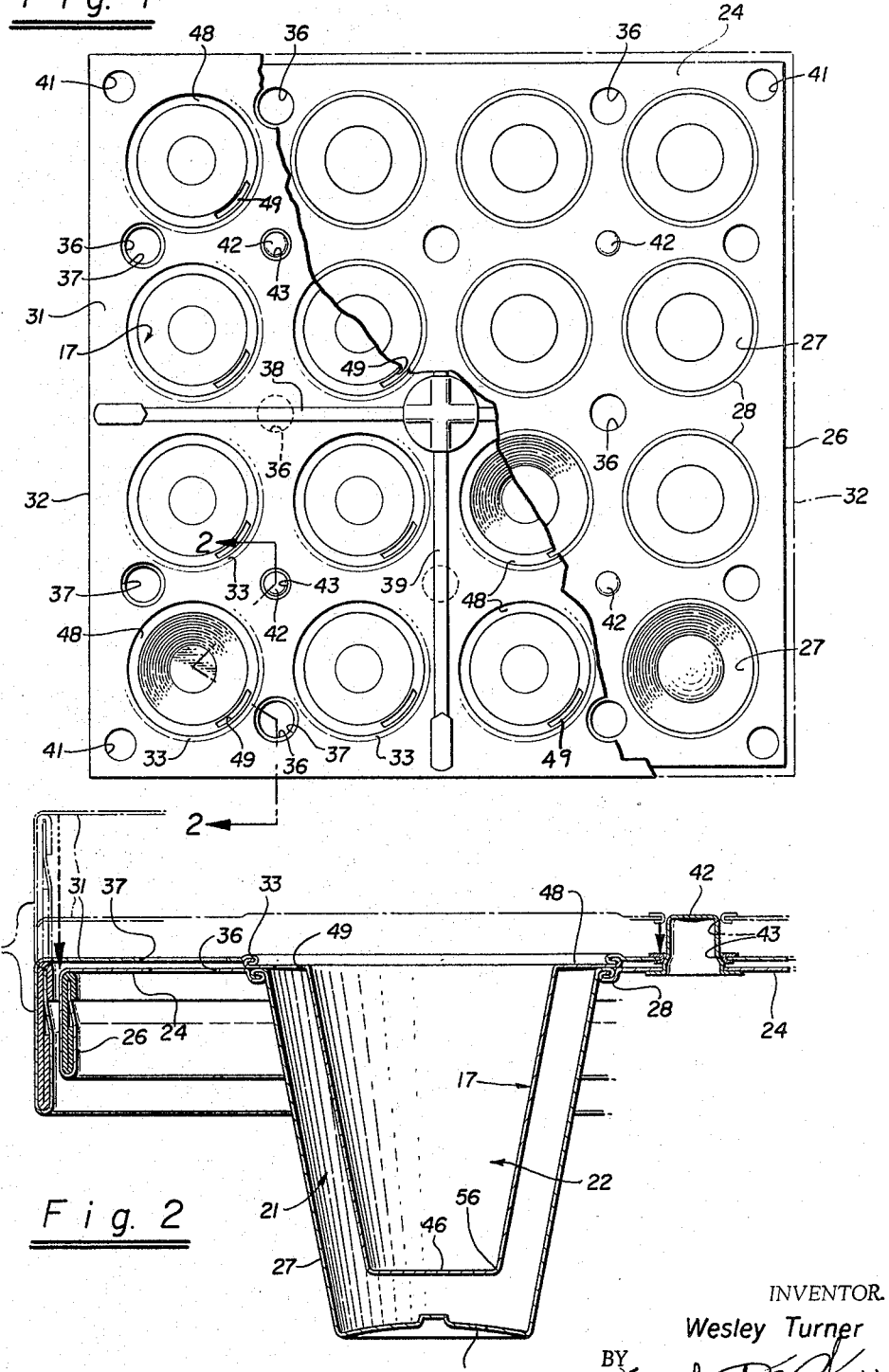
INVENTOR.
Wesley Turner
BY
His Attorney Dec. 6, 1966  W. TURNER  3,290,154
EDIBLE BAKED CUP-SHAPED PRODUCT AND METHOD FOR MAKING SAME
Filed May 13, 1964  2 Sheets-Sheet 2
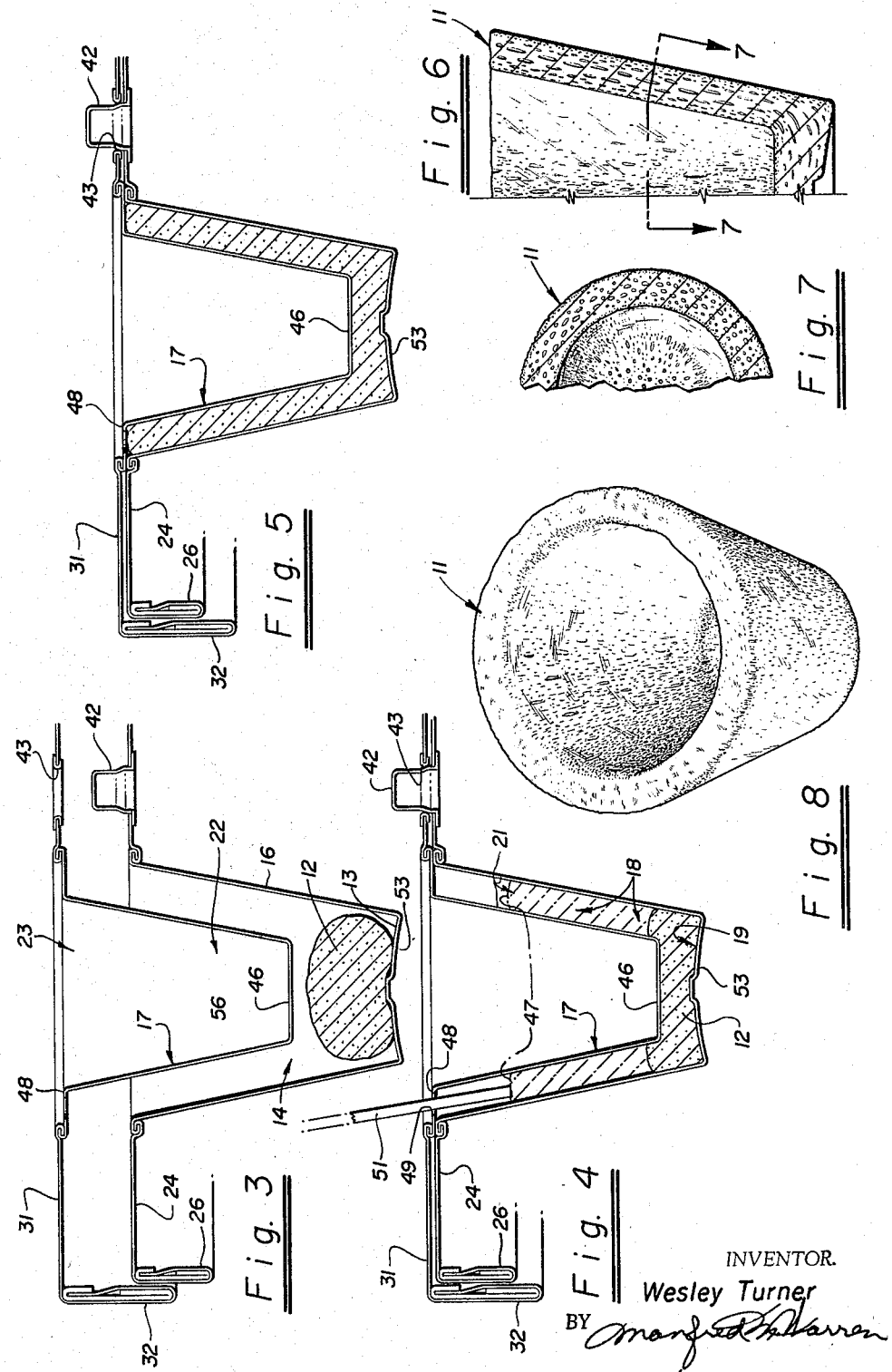
INVENTOR.
Wesley Turner
BY
His Attorney

United States Patent Office 3,290,154
Patented Dec. 6, 1966

3,290,154
EDIBLE BAKED CUP-SHAPED PRODUCT AND
METHOD FOR MAKING SAME
Wesley Turner, Albany, Calif., assignor, by mesne assignments, to Wesley Turner and Florence E. Turner
Filed May 13, 1964, Ser. No. 367,032
7 Claims. (Cl. 99—88)

This application is a continuation-in-part of my copending patent application for an edible article and method of manufacture, Serial No. 143,432, filed October 6, 1961, now abandoned.

The invention relates generally to food products, and more particularly to baked products formed from a leavened dough.

A cup-shaped hollow open topped edible product can be filled with various types of complementary food substances to form a combined food product that can be hand held and eaten without need for plates, spoons, or other utensils. Articles in this general category are well known in the art, such as ice cream cones and various types of hot dog buns.

The present invention is directed to a product characterized by relatively high side walls in relation to a smaller base diameter. The advantages of such a configuration include easier handling or grasping by one hand, holding heated foods longer with a minimum reduction in temperature because of the smaller exposed upper area, and the retention of a substantial quantity of food in a relatively compact easily held product.

In addition to the foregoing, the instant invention is directed to a cup-shaped product having suitable structural form retaining properties yet which is not a solid hard crust or wafer product such as ice cream cones or the like. Rather, the instant cup is characterized by relatively thick walls including an interior portion defined by a relatively soft large cell noncrusted characteristic. In this manner the cup itself becomes a substantial part of the combined food product, as opposed to being merely a container for the filler. It is accordingly important that the thick walls not only be edible but that they have a palatable taste characteristic, which is in part provided by the relatively soft inner crumb structure.

It will of course be appreciated that a soft crumb material affords little if any structural form retaining properties, particularly when the cup is filled with food products that may be heated or that include liquids such as gravies or the like. Accordingly, the instant food cup is formed with a crust on both its inner and exterior surfaces. This configuration has been found to improve greatly the structural properties of the cup, and accordingly various types of fillings, to be described, can be retained for extended periods without causing softening or deterioration of the cup structure, even when being held or otherwise manipulated.

The production of a leavened dough cup-shaped food product having the above characteristics presents certain problems that are not apparent in the formation of other cups having different configurations and properties. In particular, the provision of relatively tall side walls and a smaller base diameter is not readily achieved while maintaining a suitably palatable soft inner crumb structure with the above noted inner and outer crusted surfaces. Previous techniques and apparatus when used in attempting to form the instant product have been found unsatisfactory. Such teachings tend to produce a product that is characterized by a relatively brittle all-crust wall structure, or by a wall structure having only an outer crust, and generally by a wall structure having an unsuitable inner soft crumb structure inferior in taste characteristics as compared to the instant cup.

It is noted that the instant cup can be produced from different types of leavened dough, including a kneaded type bread dough or a liquid batter type of cake dough. In either case it is important that the dough include a chemical leavening agent to provide a rise action during the baking of the product. Although this rise has been found essential to the formation of a palatable softer inner crumb structure, it has also created problems in obtaining the required structural properties noted above. In particular regard to the formation of a cake cup from liquid batter dough, it has been found that as the dough initially rises in the molds it tends to fix or crust on the mold surfaces and form cracks or fissures. It was necessary to devise a method for remedying this problem, since a wall structure having such irregularities is completely unsatisfactory from the standpoint of the required structural properties.

Accordingly, an important object of the present invention is to provide a leavened dough cup-shaped food product, and a method and apparatus for making same, which has a relatively tall side wall in relation to its base diameter yet which also has crusted inner and outer surfaces with an interposed strata of a relatively softer crumb.

Another object of the invention is to provide a method of forming leavened dough cup-shaped food products in which the side wall portion thereof is at least partially formed by rising during a baking procedure, in which the raised upwardly extending wall portion is formed with crusted inner and outer surfaces and with an interposed strata of a relatively softer crumb.

A further object of the present invention is to provide a cup-shaped bread product of the type described, and a method and apparatus for producing same, which can be filled with a wide variety of foods, including heated foods having substantial moisture content, and which retains its configuration and structural properties for extended periods of time. In this regard it is noted that the instant cup when formed from a suitable bread dough can be filled with hot foods such as chili, beans, beef stew, various casseroles, and the like, or cold foods such as tuna fish, deviled egg, etc. As a product formed from a cake batter, the instant cup can be filled with various types of dessert fillings such as ice cream, fruit, or pudding, and moreover can retain liquids such as hot fudge or other syrups used with desserts. Because the combined product is readily made, and can be hand held without the need for utensils, it is particularly suitable for serving at snack bars, drive-ins, schools, buffet dinners, and various outdoor sporting events or the like.

Still another object is to provide a food cup of the type described that can be placed upright on a flat surface such as a table, and which can be kept in such position while filled with any of the above foods without having its structure soften or deteriorate so as to cause the cup to tip over and spill.

An even further object is to provide a food cup having relatively thick walls which form a substantial part of the combined filled product, which walls have a highly palatable taste characteristic yet which also are characterized by the above noted structural properties. Further in this regard it is noted that by having a thick wall with a relatively soft crumb inner strata, the juices from the food filler can penetrate into this strata and mix therewith to form a highly palatable mixture between such juices and the cup. It is noted that the aforesaid inner crust of the cup is important with regard to the foregoing mixture of filler liquids and the cup, since the inner crust tends to cooperate with the outer crust in preventing softening or deterioration of the cup walls and bottom, while nevertheless permitting the juices or liquids to be absorbed partially into the inner soft crumb strata. Because of the two spaced crust surfaces, the softening of the inner strata is controlled in a manner that prevents deterioration of the cup and which enables the juices to be retained for extended periods. Also, it is important that the inner crust while having suitable rigidity in addition have a more porous characteristic. In this manner, juices can penetrate somewhat through the inner crust for absorption by the softer inner strata, yet not soak through the outer less porous crust. In comparison with the instant cup as just described, it has been found that cups formed with an uncrusted inner surface, although otherwise similar, becomes soggy relatively quickly and are clearly inferior to the instant cup as regards the preservation of shape and structure.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

FIGURE 1 is a top plan view, with portions broken away, of a pan mold apparatus formed in accordance with the present invention.

FIGURE 2 is an enlarged fragmentary cross sectional view of the structure shown in FIGURE 1 taken along the line 2—2 shown therein.

FIGURE 3 is a fragmentary cross sectional view similar to that of FIGURE 2 depicting an initial step in a method of the present invention.

FIGURE 4 is a view similar to that of FIGURE 3, depicting a subsequent step in the aforesaid method.

FIGURE 5 is a view similar to that of FIGURE 4 depicting the final cup product as formed in the instant mold apparatus.

FIGURE 6 is a fragmentary cross sectional elevation view of a cup product formed in accordance with the present invention.

FIGURE 7 is a fragmentary cross sectional plan view taken along the line 7—7 in FIGURE 6.

FIGURE 8 is a perspective view of the cup product shown in FIGURES 6 and 7.

The method of the present invention for producing an edible baked cup-shaped product, such as an edible cup 11 depicted in FIGURE 8, generally consists in depositing a predetermined quantity of leavened dough, such as a ball 12 of bread dough as shown in FIGURE 3, into the bottom 13 of a female mold cavity 14 having upwardly diverging sides 16; inserting a cup-shaped male mold 17 axially into the cavity 14 to form therewith a cup-shaped chamber 18 as shown in FIGURE 4 for confining dough therein and having a chamber bottom 19 and a contiguous upstanding annular upwardly diverging chamber side wall 21; selecting said predetermined dough quantity to fill substantially only said chamber bottom 19 as shown for example by the solid line representation in FIGURE 4; including in the dough a chemical leavening agent to provide raising of said dough during baking to fill said chamber side wall 21; placing the molds and dough in a baking environment to provide a baking of said dough and a rising thereof in the chamber side wall 21; and forming the chamber bottom 19 with a sufficient thickness in relation to the height and thickness of the chamber side wall 21 so as to provide during baking a relatively prolonged flow of dough from the chamber bottom into the side wall to augment the rising action of the dough therein.

Another important feature of the method and apparatus of the present invention is the forming of the male mold 17 with a hollow interior 22 and open top 23 and the making of provision for an upward circulation of heated air during baking of the product from around the exterior of the female mold 14 to the open top interior of the male mold 17 for baking of the interior wall of the cup.

It has been found that this circulation of air is required to form the aforementioned interior crust surface. In order to economically bake and handle the cup products in commercial quantities a plurality of female mold cavities 22 is provided in a flat baking pan 24 which is formed of generally rectangular shape and with a depending peripheral flange 26, see FIGURES 1 and 2. A grid iron arrangement of sixteen mold cavities is provided in this baking pan, here arranged in a four by four grid. The individual female molds may be formed of sheet metal cups 27, see FIGURE 2, which are seamed, as at 28, at their upper peripheries in openings provided in the pan 24 which may be similarly formed of sheet metal suitable for baking. It will also be observed with reference to FIGURE 1 that substantial space is provided between each of the cups 27 so as to allow for the free flow of oven air completely around the exterior of these cups.

To complete the mold assembly, a top mold pan 31 is formed and dimensioned to overlie the lower pan 24 and is formed with a relatively deep depending peripheral flange 32 which will surround flange 26 when the pans are assembled as illustrated in FIGURES 1 to 5, so as to first locate and guide the pans into proper superimposed assembled relation and to hold the pans in such relation. As in the case of the bottom pan, the top pan is provided with a plurality of cup-shaped male molds 17 and these are preferably formed as individual sheet metal cups which may be seamed as at 33 into openings provided in the top pan 31 so as to locate the male cups 17 in precise axial alignment with the female mold cups 27 in the assembled position of the pans. As an important feature of the present construction the two superimposed pans 24 and 31 are formed with a plurality of registering openings 36 (in the bottom pan 24) and 37 (in the top pan 31). These registering openings are generally arranged in the spaces between the internesting cups 17 and 27 and thus provide for the flow of heated oven air which would be otherwise trapped below pan 24 up through the openings to circulate around and into the hollow interior 22 of cup 17.

Preferably the top pan 31 is provided with one or more reinforcing bars, such as cross bars 38 and 39 which are secured to the underside of the pan for holding the latter in a flat planar position. Also preferably drain holes 41 are provided at the four corners of the pans to assist in drawing out after washing of the pans. Also to insure a precise axial alignment of the mold cups, there is provided on the lower pan 24 a plurality of upstanding locating cylinders 42 which are located for entry through a plurality of aligned locating openings 43 in the top pan 31. Four of these cylinders and openings are arranged in a quadrangle to insure a very precise final location of the pans in proper registration. This is most important to insure a dependable uniformity of the resulting baked products. With reference to FIGURES 3 and 4 it will be seen that the pans are first guided into assembled relation by the engagement of the relatively deep depending flange 32 with the outside of the depending flange 26 provided on the base pan 24. Since these flanges extend around the four sides of the two pans, very little relative lateral displacement of the pans can be effected after telescoping of the flanges as seen in FIGURE 3. The final and more precise location of the pans is effected as openings 43 are threaded over the locating cylinders 42. Preferably the upper extremity of the cylinders are reduced slightly in diameter to assist the initial threading of the cylinders in the openings.

One of the products of the present invention is a baked bread cup and the preferred method for its preparation is depicted in FIGURES 3, 4 and 5 of the drawings. As will be understood bread dough is normally formed by mixing and kneading flour, water, yeast and salt. These ingredients are combined usually in a mechanical mixer until the dough assumes a smooth consistency. In this mixing action the water combines with the protein of the flour to form a plastic gluten which retains the gas subsequently generated in a cellular structure. Conventional bakery equipment for mixing the ingredients and dispensing measured dough quantities such as the "Pan-O-Mat" equipment may be used for present purposes. Preferably a no-time dough is used, that is one which is taken directly from the mixing equipment into the proofing step without an intervening fermentation step.

The dough balls 12 are deposited in the bottom of the female mold pans 14 and the size of the ball is preferably such as it more or less centers itself in the bottom of the pan. Upon assembly of the top pan the base 46 of the male mold 17 engages the top of the doughball 12 and depresses and extrudes the dough laterally out to the side 16 of the female mold and around the base 46 of the core mold 17 so as to essentially fill the bottom 19 of the mold chamber as illustrated in solid lines in FIGURE 4. The assembled pans and dough are then placed in a proofing box (not shown) maintained at a temperature of about 95° to 115° with about 100° being preferred until the dough rises within the chamber side wall 21 to a predetermined height 47 indicated in phantom line in FIGURE 4. Preferably this height 47 represents roughly two-thirds of the total desired rise of the dough and its rather precise determination in the process of the present invention is important. Accordingly there is provided in a top flat section 48 of the sheet metal cup 17 rather large circumferentially elongated openings 49 which register with the top of the mold chamber side wall 21 so as to permit the baker to view the upper edge of the proofed dough in the side wall 21 to determine the proper point at which the pans are to be removed from the proof box and placed in the oven for baking. Normally the proofing time will run from 50 to 70 minutes depending upon all of the factors and an average time is about one hour. Preferably the baker is provided with a gauge stick 51 which he may insert through openings 49 for determining the height of the raised dough. By way of example a preferred size of bread cup which has been evolved has approximately the following dimensions as defined by the mold chamber: overall height about 2¾ inches, outside base diameter about 2¼ inches, outside diameter at the open top of the cup about 3¼ inches, side wall thickness about ⅜ inch and bottom thickness about ½ inch. In such a cup it is desired to proof the dough in the chamber side wall 21 up to about ¾ inch from the top 48 of the chamber.

After proofing of the dough as aforesaid the assembled pans and raised dough are placed in an oven for baking. A preferred baking temperature for the bread cup product is in the range of 400° F. and 450° F. with approximately the midpoint of the range, 425° F. being preferred. Baking time will run from about 15 to 20 minutes which is sufficient to produce a golden brown crust over the full exterior of the cup and a somewhat lighter golden brown crust in the interior of the cup. The inside crumb temperature will increase to about 212° by the end of the baking step.

The increased temperature of the product in the oven causes the gas production of the yeast to be accelerated and importantly in the present product there is included within the dough a chemical leavening agent which is effective in augmenting the gas generation during the baking step and which takes over from the yeast action as the latter is exhausted and killed by the increased temperature (over about 140° F.). Preferably a type of chemical leavening agent is selected which is relatively inactive at the lower temperatures and so produces very little action until the dough is placed in the oven. A preferred leavening agent in the case of the bread cup is the combination of sodium bicarbonate and sodium aluminum phosphate-mono calcium phosphate blend (ACTIF. 8) in the proportions of about 0.7% and 0.8% respectively of the total dry mix not including water or yeast. Yeast is included in the mix in a proportion of about 3% to 3½% of the total weight of the mix not including water. The quantity of dough and leavening agents are selected to produce a full rise of the product in the mold chamber side wall during the baking step so that the top of the product will come up to the underside of section 48 of the upper mold pan as illustrated in FIGURE 5 of the drawings. For the size of bread cup above outlined a dough ball of about 1¾ ounces is satisfactory.

During the proofing and baking steps above discussed the confining of the dough within the mold chamber effects a crowding compression of the dough with a resulting denser baked structure in the bottom and side walls of the cup than in unconfined baked products. There is not only an improved overall density of the material, but there is a progressive improvement in density toward the bottom area of the cup. This greater density together with the inner and outer crust structure as above discussed provides a cup which will resist the moistening effect of edible fillers containing a high liquid content during the time the cup is being consumed. The greater density in the bottom of the cup gives greater moisture resistance at the point in the cup where it is most needed. When one of the cups of the present invention is cut in half as depicted in FIGURE 6 of the drawing it will be observed that the gas cells are relatively small and oblong extending lengthwise of the side walls.

The bread cup of the present invention will hold liquids such as normally thickened beef gravy without leaking over an indefinitely long period of time. The liquid penetration will normally be up to about one-third of the wall thickness thereby leaving a substantial unsoaked wall thickness for affording strength and stability to the bread structure. As another feature of the present invention, the bottom of the cup is given a concave shape, which has several advantages. This shape insures the widest possible base support and optimum baking of the bottom corners of the cup for maximum stability, and also lengthens the corner thickness to afford more room for liquid penetration. Experience has shown that in the case of flat bottomed cups, moisture penetration could cause bulging of the bottom and weakness in stability and the cups would turn over or tip when allowed to stand alone without manual or other auxiliary support. With reference to the drawings, it will be seen that the bottom concave form of the cup is produced by forming the bottom 53 of the sheet metal cups 27 with an upwardly convex form. A further indentation 54 may be formed in the bottom to provide a suitable symbol or trademark identifying the goods and which will be accordingly baked into the bottom of the cup.

The combination proofing and baking rise is important and co-functions with the relative dimensions of the chamber bottom and side walls for reproducing a product of maximum quality. Proofing of the product as above mentioned for about one hour at about 100° F. affords a desired cell structure. Proofing at too high a temperature produces too fast gas action which exhausts the yeast; limits the product rise in the oven; and causes a coarse open cell structure. Similarly, over-proofing causes the production of larger cells and possible leaking, preventing the attaining of a more compact, dense structure, as above described. In the final baking step, the presence of the chemical leavening agent materially aids in gas production and contributes to the overall growth of the cup structure. Importantly, the provision of a relatively thicker base functions as a reservoir in which the central portion of the dough remains cooler thus delaying the yeast kill and maintaining gas production in the bottom section to force dough flow from the bottom up the side walls after gas production in the side walls has ceased. In this connection, I have found that a minimum side wall thickness should be in the order of 5/16 inch. If the side wall is much thinner, the dough heats through quickly and the yeast is prematurely killed and relatively no raising action of the dough from this source is obtained during the baking action. Also, an adequate wall thickness is required in order to obtain an upflow of rising dough through the interior of the side wall after its inner and outer surfaces have baked and stopped growing. The concave shape of the bottom and the greater corner dimension thereby provided assists in obtaining a flow of dough from the bottom reservoir around the bottom corners and up into the interior of the side walls. Also it is preferable to round the bottom corner 56 of the male mold 17 to assist the dough flow in the chamber around this corner.

Another form of the product 11 of the present invention is to make the product from a cake mix as well as a bread mix. In such case, a cake batter is filled into the bottom of the mold chamber in the identical manner of the bread dough and as illustrated in FIGURE 4. However, in the case of the cake mix, it is preferable that only a chemical leavening agent be used so that the total rise of the product is obtained during the baking step and no proofing of the product is involved. One example of such chemical leavening agent is the combination of soda and V–90 phosphate included in the cake mix in the proportions of about 0.1% and 0.2% respectively of the total weight of the dry mix. Another example of a suitable chemical leavening agent for the cake mix product is the combination of soda, V–90 phosphate, and Victor cream phosphate included in proportions of about 0.6%, 0.4% and 0.4% respectively based upon the total weight of the dry ingredients.

Using mold chamber sizes above outlined, a satisfactory quantity of liquid cake batter for each cup is about 1½ to 1¾ ounces. Baking is preferably effected in a somewhat cooler oven than in the case of the bread cup. An oven temperature of approximately 350° is preferred and a baking time of about 20 to 25 minutes is satisfactory.

In the case of the cake cup, the batter dough rises rapidly in contact with the hot walls of the pan. The dough climbs the side wall of the pan in somewhat of a capillary action due to heat leaving a dip in the center which is subsequently filled by the reservoir action of the dough in the chamber bottom. Also there is a tendency of the dough on the hot pan walls to crack and form fissures which must be filled by the subsequent dough flow in order to obtain a satisfactory product. Thus if the side walls are too thin or if the bottom reservoir is insufficient for present purposes a poor crumb structure and a cracked fissured side wall results. I have found that by using the chamber dimensions above given that the reserve and delayed flow from the chamber bottom will fill up the interior of the side wall, insure a full desired rise of the side wall, and completely fill and seal off cracks and fissures which may have formed at the interior and exterior surfaces of the side wall.

I claim:

1. The method of producing an edible baked cup-shaped product having a height at least equal to its base diameter in an enclosed mold which consists in depositing a predetermined quantity of leavened dough in the bottom of a female mold cavity having upwardly diverging sides, inserting a cup-shaped male mold axially into said cavity to form therewith a cup-shaped chamber for confining said dough therein and having a chamber bottom at least about 7/16 inch and a contiguous upstanding annular upwardly diverging chamber side wall having a substantially constant thickness at least about 5/16 inch, said male mold being formed with a hollow interior and open top, and including openings for an upward circulation of heated air during baking of the product from around the exterior of said female mold to the open top interior of said male mold for baking the interior wall of said product, selecting said predetermined dough quantity to fill substantially only said chamber bottom, including in said dough a chemical leavening agent to provide raising of said dough during baking to fill said chamber side wall, placing said molds and dough in a baking environment to provide a baking of said dough and an extrusion of said dough in said bottom chamber laterally and upwardly into said side wall chamber and a rising thereof in said chamber side wall, and forming said chamber bottom with a thickness greater than the thickness of said side wall chamber and sufficient in relation to the height and thickness of said chamber side wall so as to provide during baking a relatively prolonged flow of dough from said bottom into said side wall to augment the rising action of the dough therein and to fill all cracks and fissures formed in said chamber side walls.

2. The method of producing an edible cup-shaped bread product which consists in depositing a predetermined quantity of leavened dough in the bottom of a female mold cavity having upwardly diverging sides, inserting a cup-shaped male mold axially into said cavity to form therewith a cup-shaped chamber for confining said dough therein, and having a chamber bottom and a contiguous upstanding annular upwardly diverging chamber side wall, having substantially constant thickness, said dough being depressed and extruded laterally by the step of inserting said male mold and said male mold is formed of a hollow interior and open top, and including an upward circulation of heated air during baking of the product around the exterior of said female mold and to the open top interior of said male mold for baking the interior wall of said product, and wherein the height of said cup product is at least equal to substantially its base diameter, said chamber side wall has a thickness of at least about 5/16 inch, and said chamber bottom has a thickness of at least about 7/16 inch, selecting said predetermined dough quantity to fill substantially only said chamber bottom, including yeast and a chemical leavening agent in said dough, proofing said dough while in said molds to effect a rising of said dough by said yeast only in said chamber side wall a predetermined distance of approximately two-thirds of the total rise and the rise of said dough in baking is approximately one-third of the total rise, placing said molds and dough in a baking environment to bake said dough and effect the rising thereof substantially the balance of the height of said chamber side wall, by said yeast and said chemical leavening agent, and forming said chamber bottom with a thickness greater than the thickness of said side wall chamber and sufficient in relation to the height and thickness of said chamber side wall so as to provide a relatively prolonged flow of dough from said bottom into said side wall to augment the rising action of the dough therein.

3. The method of producing an edible cup-shaped bread product which consists in depositing a predetermined quantity of leavened dough in the bottom of a female mold cavity having upwardly diverging sides, inserting a cup-shaped male mold axially into said cavity to form therewith a cup-shaped chamber for confining said dough therein, and having a chamber bottom and a contiguous upstanding annular upwardly diverging chamber side wall having substantially constant thickness said dough being depressed and extruded laterally by the step of inserting said male mold and said male mold is formed of a hollow interior and open top, and including an upward circulation of heated air during baking of the product around the exterior of said female mold and to the open top interior of said male mold for baking the interior wall of said product, and wherein the height of said cup product is at least equal to substantially its base diameter, said chamber side wall has a thickness of at least about 5/16 inch, and said chamber bottom has a thickness of at least about 7/16 inch, selecting said predetermined dough quantity to fill substantially only said chamber bottom, including yeast and a chemical leavening agent in said dough, proofing said dough 50–70 minutes at an ambient temperature of 95° F. to 115° F. while in said molds to effect a rising of said dough by said yeast only in said chamber side wall a predetermined distance of approximately two-thirds of the total rise and the rise of said dough in baking is approximately one-third of the total rise, placing said molds and dough in a baking environment for 15 to 20 minutes at an ambient temperature of 400° to 450° F. to bake said dough and effect the rising thereof substantially the balance of the height of said chamber side wall by said yeast and said chemical leavening agent, and forming said chamber bottom with a thickness greater than the thickness of said side wall chamber and sufficient in relation to the height and thickness of said chamber side wall so as to provide a relatively prolonged flow of dough from said bottom into said side wall to augment the rising action of the dough therein.

4. The method of producing an edible baked cup-shaped cake product having a height at least equal to substantially its base diameter in an enclosed mold which consists in depositing a predetermined quantity of liquid batter dough in the bottom of a female mold cavity having upwardly diverging sides, inserting a cup-shaped male mold axially into said cavity to form therewith a cup-shaped chamber for confining said dough therein and having a chamber bottom and a contiguous upstanding annular upwardly diverging chamber side wall having a substantially constant thickness, said male mold being formed with a hollow interior and open top, and including an upward circulation of heated air during baking of the product from around the exterior of said female mold to the open top interior of said male mold for baking the interior wall of said product, and wherein said chamber side wall has a thickness of at least 5/16 inch, said chamber bottom has a thickness of at least about 7/16 inch, selecting said predetermined dough quantity to fill substantially said chamber bottom, including in said dough a chemical leavening agent to provide raising of said dough in said chamber side wall, baking said dough 20 to 25 minutes at an ambient temperature of about 350° F. in said molds and causing rising thereof in said chamber side wall, and forming said chamber bottom with a thickness greater than the thickness of said side wall chamber and sufficient in relation to the height and thickness of said chamber side wall so as to provide during baking a relatively prolonged flow of dough from said bottom into said side wall to augment the rising action of the dough therein and to fill all cracks and fissures formed in said side wall chambers during baking.

5. The product produced by the method of claim 1.
6. The product produced by the method of claim 2.
7. The product produced by the method of claim 4.

References Cited by the Examiner

UNITED STATES PATENTS

| | | |
|---|---|---|
| 1,510,279 | 9/1924 | Huth et al. |
| 1,728,064 | 9/1929 | Johnson. |
| 1,928,391 | 9/1933 | Niklason _____ 107—1.1 |
| 1,936,835 | 11/1933 | Fairchild _____ 99—88 |
| 1,979,429 | 11/1934 | Wilkes et al. |
| 2,078,102 | 4/1937 | Siela. |
| 2,089,923 | 8/1937 | Leaf et al. |
| 2,585,000 | 2/1952 | Friddell. |
| 2,877,117 | 3/1959 | Heyman _____ 99—89 |
| 2,968,561 | 1/1961 | Birnkrant _____ 99—89 |
| 3,157,134 | 11/1964 | Heyman _____ 107—4 |

RAYMOND N. JONES, *Acting Primary Examiner.*

A. LOUIS MONACELL, *Examiner.*